United States Patent
Jakoby

(10) Patent No.: US 6,924,214 B2
(45) Date of Patent: Aug. 2, 2005

(54) METHOD FOR CALCULATING A TIME-RELATED FILL LEVEL SIGNAL

(75) Inventor: Bernhard Jakoby, Vienna (AT)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/416,109

(22) PCT Filed: Aug. 24, 2002

(86) PCT No.: PCT/DE02/03117
§ 371 (c)(1),
(2), (4) Date: Oct. 9, 2003

(87) PCT Pub. No.: WO03/025521
PCT Pub. Date: Mar. 27, 2003

(65) Prior Publication Data
US 2004/0029366 A1 Feb. 12, 2004

(30) Foreign Application Priority Data
Sep. 12, 2001 (DE) .......................................... 101 44 875

(51) Int. Cl.⁷ .......................... H01L 21/30; H01L 21/36
(52) U.S. Cl. .......................... 438/496; 438/907; 73/223
(58) Field of Search .................................. 438/496, 497, 438/788, 792, 907; 73/223, 224, 40, 290, 304

(56) References Cited

U.S. PATENT DOCUMENTS

| 2,982,908 | A |   | 5/1961 | Erickson et al. |         |
|-----------|---|---|--------|-----------------|---------|
| 3,862,473 | A | * | 1/1975 | Felix et al.    | 19/240  |
| 5,923,930 | A | * | 7/1999 | Tsukamoto et al.| 399/237 |
| 6,202,483 | B1| * | 3/2001 | Barcus          | 73/224  |

FOREIGN PATENT DOCUMENTS

| FR | 1 389 869 | 2/1965 |
| WO | 01 20271  | 3/2001 |

* cited by examiner

*Primary Examiner*—Phuc T. Dang
(74) *Attorney, Agent, or Firm*—Kenyon & Kenyon

(57) ABSTRACT

In a method for calculating a time-related fill level signal (h(t)) from a sensor signal (s(t)) of a fill level sensor for detection of the fill level of a liquid, the time-related fill level signal (h(t)) is calculated as a function of the sensor signal (s(t)) and the modeled runoff behavior of the liquid on the fill level sensor.

7 Claims, 2 Drawing Sheets

METHOD FOR CALCULATING A TIME-RELATED FILL LEVEL SIGNAL

FIELD OF THE INVENTION

The present invention relates to a method for calculating a time-related fill level signal from a sensor signal of a fill level sensor for detecting the fill level of a liquid. The present invention further relates to a fill level measurement system having at least one fill level sensor for detecting the fill level of a liquid, and a calculation unit for calculating a time-related fill level signal from the sensor signal of the at least one fill level sensor, for performing the method.

BACKGROUND INFORMATION

There are fill level measurement systems having fill level sensors that are immersed into a liquid are used in particular in motor vehicles. Detection of the liquid level is accomplished, for example, using capacitative fill level sensors, the capacitance of the sensor structures being influenced by the liquid level and by the dielectric properties of the liquid.

In determining a time-related fill level signal, however, the problem often occurs that the fill level fluctuates considerably, e.g. when the motor vehicle is being moved.

Therefore, a determination of the resulting fill level signal may be made over time in order to estimate the quantity of liquid present, e.g. the quantity of engine oil or fuel.

The fill level sensors are embodied as elongated sensor elements that are occupied by sensor structures along the fill level region that is to be detected. With highly viscous liquids in particular, the problem caused by a fluctuating liquid level may be that a liquid film forms on sensor surfaces that are briefly wetted. In the case of analog capacitative or thermal fill level sensors, for example, this liquid film may cause a positive error signal. The sensor signal for calculating the instantaneous fill level is then too great because of the liquid film left behind.

After a while, these liquid films run off again as a function of the liquid's properties, such as density and viscosity. As a result, the error signal disappears. With a fluctuating fill level, however, this liquid film is renewed at regular intervals, so that a fill level signal averaged over time exhibits a positive error.

SUMMARY OF THE INVENTION

It is therefore an object of the exemplary embodiment and/or method of the present invention to provide a method for calculating a time-related fill level signal from a sensor signal of a fill level sensor, with which the fill level can be ascertained substantially more accurately.

According to the exemplary embodiment and/or method of the present invention, the time-related fill level signal is calculated as a function of the sensor signal and the runoff behavior of the liquid on the fill level sensor.

The exemplary embodiment and/or method of the present invention takes into account the error caused by the liquid films that form. To do so, the behavior of the liquid in terms of running off from the surface of the fill level sensor is modeled and is used, together with the sensor signal, as a function for calculating the time-related fill level signal.

The model for the runoff behavior of the liquid on the fill level sensor should depend substantially on the material properties of the liquid, e.g. viscosity and density; on the material properties of the fill level sensor, in particular its surface finish; and also on external influences such as the liquid's temperature. These parameters either can be preset or can be ascertained using further sensors.

In the exemplary method, the function for calculating the time-related fill level signal additionally depends on the modeled effects on the sensor signal of a liquid film on the fill level sensor. The function can, for example, also take into account the inhomogeneity of a liquid film.

Since the system's behavior is generally nonlinear, the calculation may be performed using appropriate approximations. For example, it is particularly advantageous to subtract a correction signal from the fill level signal measured over time. The correction signal in this context is a function of time-related fluctuations of the fill level status. The correction signal thus depends on the most recently observed fluctuations of the fill level. These fluctuations can be characterized, for example, by a continuous time-related dispersion $\sigma(s)$, so that the correction signal can be a function of the continuous time-related dispersion.

As already explained above, the correction signal can be a function of the viscosity, density, temperature, etc. of the liquid.

For calculating a time-related-fill level signal for engine oil in an internal combustion engine, the ascertained fill level signal may be added to the magnitude of a quantity of engine oil circulating in the internal combustion engine. The circulating quantity can be determined as a function of the rotation speed of the internal combustion engine and the temperature of the engine oil.

DETAILED DESCRIPTION

Figure 1:
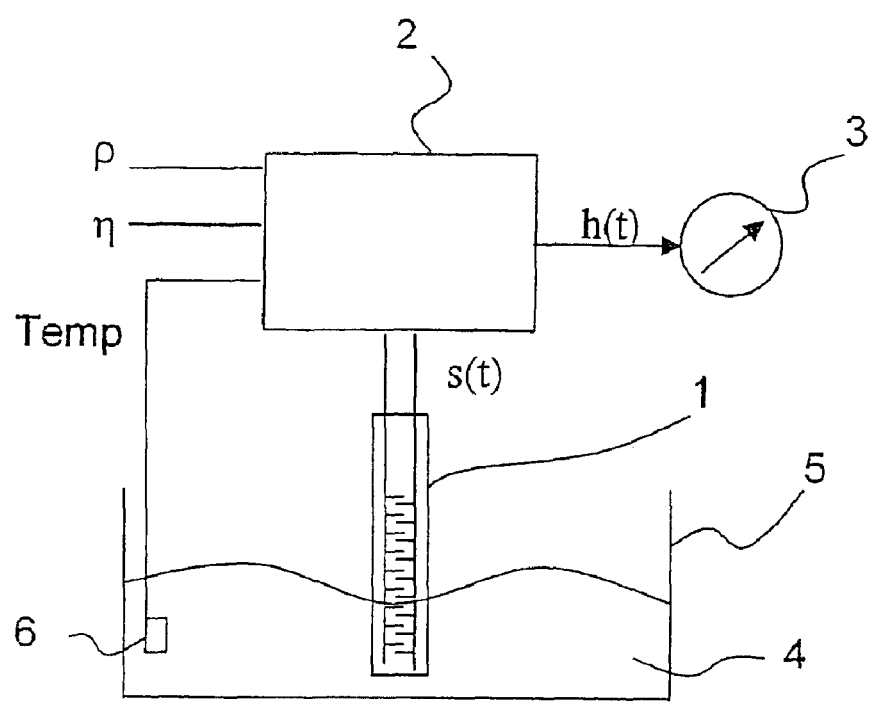
FIG. 1 shows a sketch of a fill level measurement system for performing the exemplary method according to the present invention.

FIG. 1 is a schematic sketch of a fill level measurement system that substantially has a fill level sensor 1 and a calculation unit 2 for calculating a time-related fill level signal h(t) from sensor signal s(t) of fill level sensor 1. Time-related fill level signal h(t) is displayed on an indicating unit 3.

Fill level sensor 1 is constructed, using available information, as an elongated sensor element that is immersed into a liquid 4 in a container 5. The sensor element has a sensor structure in the fill level region to be detected. In the example depicted, fill level sensor 1 is embodied as a capacitative sensor having a mutually interengaging comb-like structure.

Liquid 4 fluctuates, for example when container 5, or the motor vehicle into which container 5 is incorporated, is moved. As a result, the profile over time of fill level sensor signal s(t) also fluctuates.

The fluctuating fill level sensor signal s(t) is averaged over time in order to ascertain the actual fill level of liquid 4 in container 5.

According to the exemplary embodiment and/or method of the present invention, calculation unit 2 is now embodied in such a way that from the profile over time of sensor signal s(t) of fill level sensor 1, the actual profile over time of the fill level, i.e. fill level signal h(t) or its continuous average $\bar{h}(t)$ over time is (approximately) calculated. The method for calculating fill level signal h(t) uses an algorithm that is based on a model for the runoff behavior of liquid 4 on liquid sensor 1. This model depends, among other factors, on the material properties of liquid 4, such as viscosity and density; on the material properties of liquid sensor 1, in particular its surface finish; and also on external influences such as the temperature of liquid 4. The temperature of liquid 4 can be ascertained, for example, using a temperature sensor 6 that is immersed into liquid 4. Temperature sensor 6 is connected to calculation unit 2. Viscosity $\eta$ and density $\rho$ either are delivered to calculation unit 2 as sensor signals, or are preset values.

Calculation unit 2 is embodied, for example by suitable programming, so that the time-related fill level signal h(t) is calculated, at least approximately, as a function of sensor signal s(t) and the modeled runoff behavior of liquid 4 on fill level sensor 1. The function for calculating time-related fill level signal h(t) is moreover dependent on the modeled effects on sensor signal s(t) of a liquid film that adheres to fill level sensor 1.

These functional correlations are explained below in further detail in theoretical terms, using an example.

Figure 2:
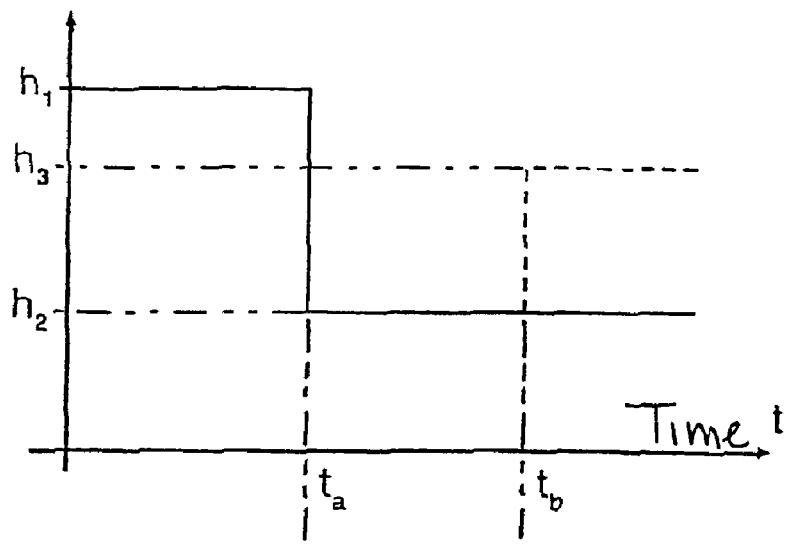
FIG. 2 shows a diagram of a fill level over time with an abrupt change in fill level.

FIG. 2 is a diagram of an idealized fill level signal h(t), plotted against time t, that changes abruptly as a function of time.

Figure 3:
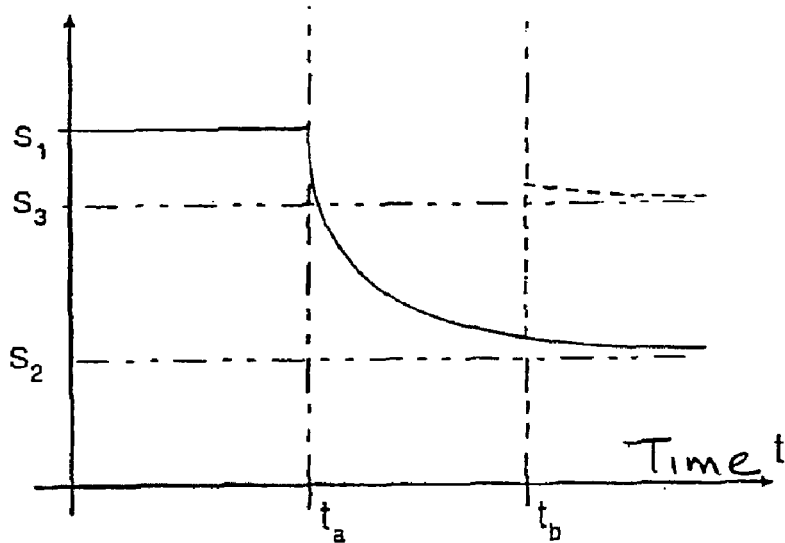
FIG. 3 shows a diagram of the change over time in the fill level signal in the context of the abrupt change in fill level shown in FIG. 2.

FIG. 3 is a diagram of sensor signal s(t), associated with fill level signal h(t), that is acquired by fill level sensor 1.

Assuming a fill level $h_1$ that is present in constant fashion for a very long time, the result is an associated "static" sensor signal $s_1$. At time $t_a$ the fill level drops abruptly to the value $h_2$. Because of the liquid film running off from the surface of elongated fill level sensor 1, sensor signal s(t) lags behind the abrupt drop in the liquid level, so that the associated static sensor signal $s_2$ is established only after a corresponding time period, for example asymptotically.

Proceeding further, dashed lines show the situation in which, at time $t_b$, fill level signal h(t) rises abruptly to fill level $h_3$. Since fill level sensor 1 is immediately wetted, sensor signal s(t) very quickly tracks this abrupt rise in fill level. Because, in the situation depicted, fill level $h_3$ is below fill level $h_1$, the result is that sensor signal s(t) "overshoots" beyond static value $S_3$ associated with fill level $h_3$, since in the fill level range from $h_3$ to $h_1$, fill level sensor 1 is still covered with a liquid film left over from the wetting prior to time $t_a$.

This illustrates the problem that the response time of sensor signal s(t) in the context of positive fill level changes $$\left(\frac{\Delta h}{\Delta t} > 0\right)$$

is much shorter than with negative fill level changes $$\left(\frac{\Delta h}{\Delta t} > 0\right).$$

This inevitably causes a shift in the continuous average over time of the time-related sensor signal s(h) to excessively high values.

The continuous average over time of sensor signal $\bar{s}(t)$ can be defined, for example, as follows:

$$\bar{s}(t) = \frac{1}{T}\int_{-T/2}^{+T/2} s(t+\tau)d\tau$$

in which time t corresponds to the time interval considered for averaging.

In order to calculate from the change over time in sensor signal s(t) a more correct change over time in the fill level, i.e. an improved fill level signal h(t) or an improved continuous average over time $\bar{h}$ thereof, a model for the runoff behavior of liquid 4 on fill level sensor 1, and a model for the effect on sensor signal s(t) of a possibly inhomogeneous liquid film, must be taken into consideration. The runoff behavior of liquid 4 on fill level sensor 1 depends, among other factors, on the material properties of the liquid, for example viscosity $\eta$ and density $\rho$.

The runoff behavior is further determined by the material properties of fill level sensor 1, e.g. the its surface finish; and by external influences such as temperature Temp of the liquid.

On the basis of these two models, sensor signal s(t) of fill level sensor 1 can be deduced from a given fill level profile with fill level signal h(t). In terms of formal analysis, this correlation can be described by the following formula:

$$s(t)=F\{h(\tau),t\}$$

using function F and fluctuation-dependent fill level signal $h(\tau)$.

What is provided by a fill level measurement, however, is sensor signal s(t), and the time-related fill level signal h(t), or its average $\bar{h}(t)$, needs to be determined. This is achieved by inverting function F.

Because of the usually nonlinear system behavior, however, this inversion is correspondingly difficult or even impossible, depending on the model. Appropriate approximations, obtained e.g. analytically or from empirical investigations, are therefore applied for the method for calculating the time-related fill level signal h(t) or its average $\bar{h}(t)$.

An exemplary method according to the present invention provides for a corrected time-related fill level signal h(t) to be calculated by subtracting a correction signal $\Delta\bar{s}$ from the aforesaid measured average fill level signal $\bar{s}(t)$.

Correction signal $\Delta\bar{s}$ is a function of the fluctuations over time of the fill level signal, and thus depends on the most recently observed fluctuations of sensor signal s(t). These fluctuations of sensor signal s(t) can be characterized analytically, for example, by a continuous time-related dispersion $\sigma(s)$ having the following function:

$$\sigma(s) = \sqrt{\frac{1}{T}\int_{-T/2}^{+T/2}(s(t+\tau)-\bar{s})^2 d\tau}.$$

The corrected time-related fill level signal h(t) or its average $\bar{h}(t)$ can then be determined from the corrected average sensor signal $\bar{s}_{corr}$ using the formula $$\bar{s}_{corr}=\bar{s}-\Delta\bar{s},$$

correction value $\Delta\bar{s}$ being a function not only of dispersion $\sigma(s)$ but also of further material properties and external influences:

$$\Delta\bar{s}=f(\sigma(s),\eta,\rho,T,\ldots).$$

Correction value $\Delta\bar{s}$ thus depends on dispersion $\sigma(s)$, viscosity $\eta$, density $\rho$, temperature T, etc.

The method is suitable in particular for ascertaining the fill level of engine oil in an internal combustion engine, since the liquid film of engine oil runs off very slowly from the surface of a fill level sensor 1. In these and similar applications, the problem additionally arises that a certain quantity of engine oil is always in circulation when the internal combustion engine is running. It is therefore additionally proposed to add to fill level signal h(t) or to sensor signal s(t) a value that represents the quantity of engine oil in circulation. This value is ascertained, in particular, as a function of the rotation speed of the internal combustion engine and temperature Temp of the engine oil.

What is claimed is:

1. A method for calculating a time-related fill level signal from a sensor signal of a fill level sensor for detecting a fill level of a liquid, comprising:

calculating the time-related fill level as a function of the sensor signal and a modeled runoff behavior of the liquid on the fill level sensor;

wherein the function for calculating the time-related fill level signal also depends on modeled effects on the sensor signal of a liquid film on the fill level sensor.

2. The method of claim 1, wherein the runoff behavior is modeled as a function of at least one of the following parameters: a liquid viscosity, a liquid density, a surface finish of the liquid sensor, and a liquid temperature.

3. The method of claim 1, wherein a correction signal is subtracted from an averaged measured sensor signal, the correction signal being a function of fluctuations over time in the fill level.

4. A method for calculating a time-related fill level signal from a sensor signal of a fill level sensor for detecting a fill level of a liquid, comprising:

calculating the time-related fill level signal as a function of the sensor signal and a modeled runoff behavior of the liquid on the fill level sensor;

wherein a correction signal is subtracted from an averaged measured sensor signal, the correction signal being a function of fluctuations over time in the fill level, and wherein the correction signal is a function of a continuous time-related dispersion.

5. A method for calculating a time-related fill level signal from a sensor signal of a fill level sensor for detecting a fill level of a liquid, comprising:

calculating the time-related fill level signal as a function of the sensor signal and a modeled runoff behavior of the liquid on the fill level sensor;

wherein a correction signal is subtracted from an averaged measured sensor signal, the correction signal being a function of fluctuations over time in the fill level, and wherein the correction signal is a function of at least one of a liquid viscosity, a liquid density, and a liquid temperature.

6. A method for calculating a time-related fill level signal from a sensor signal of a fill level sensor for detecting a fill level of a liquid, comprising:

calculating the time-related fill level signal as a function of the sensor signal and a modeled runoff behavior of the liquid on the fill level sensor; and adding to a determined fill level signal a quantity of engine oil circulating in the internal combustion engine, the circulating quantity being determined as a function of a rotation speed of the internal combustion engine and a temperature of the engine oil.

7. A method for calculating a time-related fill level signal from a sensor signal of a fill level sensor for detecting a fill level of a liquid, comprising:

calculating the time-related fill level signal as a function of the sensor signal and a modeled runoff behavior of the liquid on the fill level sensor;

wherein a correction signal is subtracted from an averaged measured sensor signal, the correction signal being a function of fluctuations over time in the fill level, and wherein the correction signal is a function of the sensor signal at a current instant and values of the sensor signal at earlier times, including time-related dispersion effects.

* * * * *

UNITED STATES PATENT AND TRADEMARK OFFICE
CERTIFICATE OF CORRECTION

PATENT NO. : 6,924,214 B2
APPLICATION NO. : 10/416109
DATED : August 2, 2005
INVENTOR(S) : Bernhard Jakoby It is certified that error appears in the above-identified patent and that said Letters Patent is hereby corrected as shown below:

Column 3,
Line 47, change "static valve $S_3$" to -- static valve $s_3$ --.

Line 60, change " $\left(\dfrac{\Delta h}{\Delta t} > 0\right)$ " to -- $\left(\dfrac{\Delta h}{\Delta t} < 0\right)$ --.

Signed and Sealed this

Twentieth Day of June, 2006

JON W. DUDAS
*Director of the United States Patent and Trademark Office*

UNITED STATES PATENT AND TRADEMARK OFFICE
CERTIFICATE OF CORRECTION

PATENT NO. : 6,924,214 B2
APPLICATION NO. : 10/416109
DATED : August 2, 2005
INVENTOR(S) : Bernhard Jakoby It is certified that error appears in the above-identified patent and that said Letters Patent is hereby corrected as shown below:

Column 2, line 47, change "static valve $S_3$" to --static valve $s_3$--

Column 3, line 10, change " $\left(\dfrac{\Delta h}{\Delta t} > 0\right)$ " to -- $\left(\dfrac{\Delta h}{\Delta t} < 0\right)$ --

Signed and Sealed this

Twenty-ninth Day of August, 2006

JON W. DUDAS
*Director of the United States Patent and Trademark Office*